(12) United States Patent
Hodowanec et al.

(10) Patent No.: US 9,618,068 B2
(45) Date of Patent: Apr. 11, 2017

(54) HEAT PIPE COOLED WET ROTATING DISC ENGAGEMENT SYSTEMS

(71) Applicant: HPEV, Inc., Tampa, FL (US)

(72) Inventors: Mark Hodowanec, Murrysville, PA (US); Timothy Hassett, Santa Rosa, CA (US)

(73) Assignee: HPEV, Inc., Tampa, FL (US)

( * ) Notice: Subject to any disclaimer, the term of this patent is extended or adjusted under 35 U.S.C. 154(b) by 196 days.

(21) Appl. No.: 14/574,546

(22) Filed: Dec. 18, 2014

(65) Prior Publication Data

US 2015/0168077 A1 Jun. 18, 2015

Related U.S. Application Data

(60) Provisional application No. 61/917,473, filed on Dec. 18, 2013.

(51) Int. Cl.

| F16D 65/853 | (2006.01) |
|---|---|
| F16D 25/12 | (2006.01) |
| F16H 57/04 | (2010.01) |
| F28D 15/02 | (2006.01) |
| F16D 55/40 | (2006.01) |
| F16D 65/78 | (2006.01) |

(52) U.S. Cl.
CPC ......... *F16D 65/853* (2013.01); *F16D 25/123* (2013.01); *F16D 55/40* (2013.01); *F16H 57/0412* (2013.01); *F16H 57/0483* (2013.01); *F28D 15/0275* (2013.01); *F16D 2065/784* (2013.01); *F16D 2065/788* (2013.01)

(58) Field of Classification Search
CPC ...... F16D 13/72; F16D 25/123; F16D 65/853; F16D 2065/784; F16D 2065/788; F16D 2300/02–2300/0214; F16D 55/40; F28D 15/00–15/06; F16H 48/00–2048/426; F16H 57/04; F16H 57/0412–57/0419; F16H 57/0483
See application file for complete search history.

(56) References Cited

U.S. PATENT DOCUMENTS

| 4,130,187 A * | 12/1978 | Midolo | F16D 65/853 |
| | | | 188/264 CC |
| 5,495,927 A * | 3/1996 | Samie | F16D 25/123 |
| | | | 188/264 E |
| 6,830,096 B1 * | 12/2004 | Fett | F16H 57/0412 |
| | | | 165/104.21 |

FOREIGN PATENT DOCUMENTS

| DE | 3736508 A1 * | 1/1989 | ........... F16D 65/853 |
| GB | 2262327 A * | 6/1993 | ............. B60K 17/22 |

* cited by examiner

*Primary Examiner* — Richard Lorence
(74) *Attorney, Agent, or Firm* — Polster Lieder

(57) ABSTRACT

In various embodiments, the present disclosure provides wet rotating disc engagement systems, e.g., a wet brake systems and/or wet clutch systems, for mobile platforms and/or stationary platforms, wherein the system comprises a plurality of first heat pipes having evaporator ends disposed within a plurality of first discs of the wet rotating disc engagement system and/or a plurality of second heat pipes having evaporator ends disposed within a plurality of second discs of the wet rotating disc engagement system. Additionally, condenser ends of the first and/or second heat pipes are disposed within oil retained within an oil reservoir of the wet rotating disc engagement system.

20 Claims, 5 Drawing Sheets

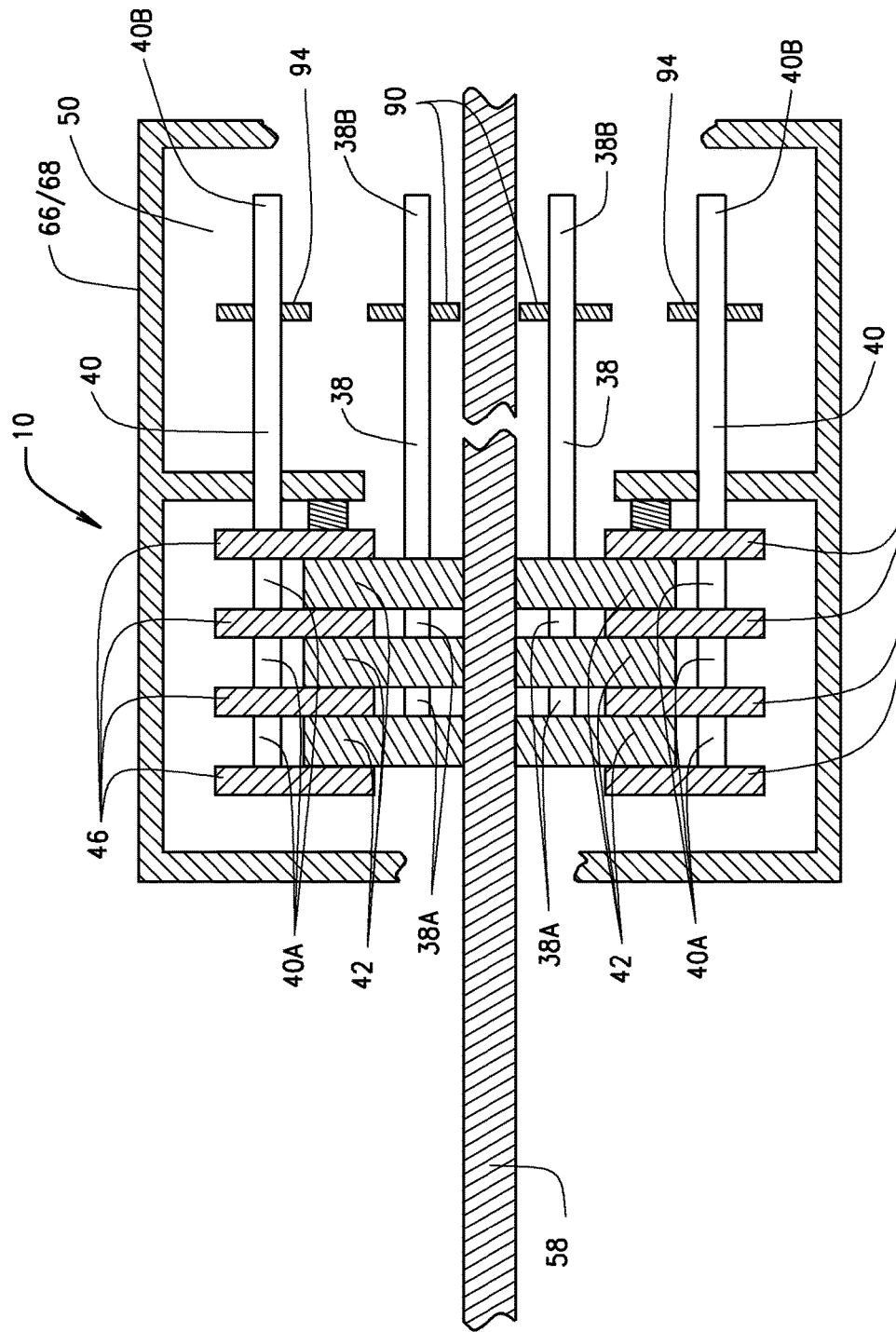

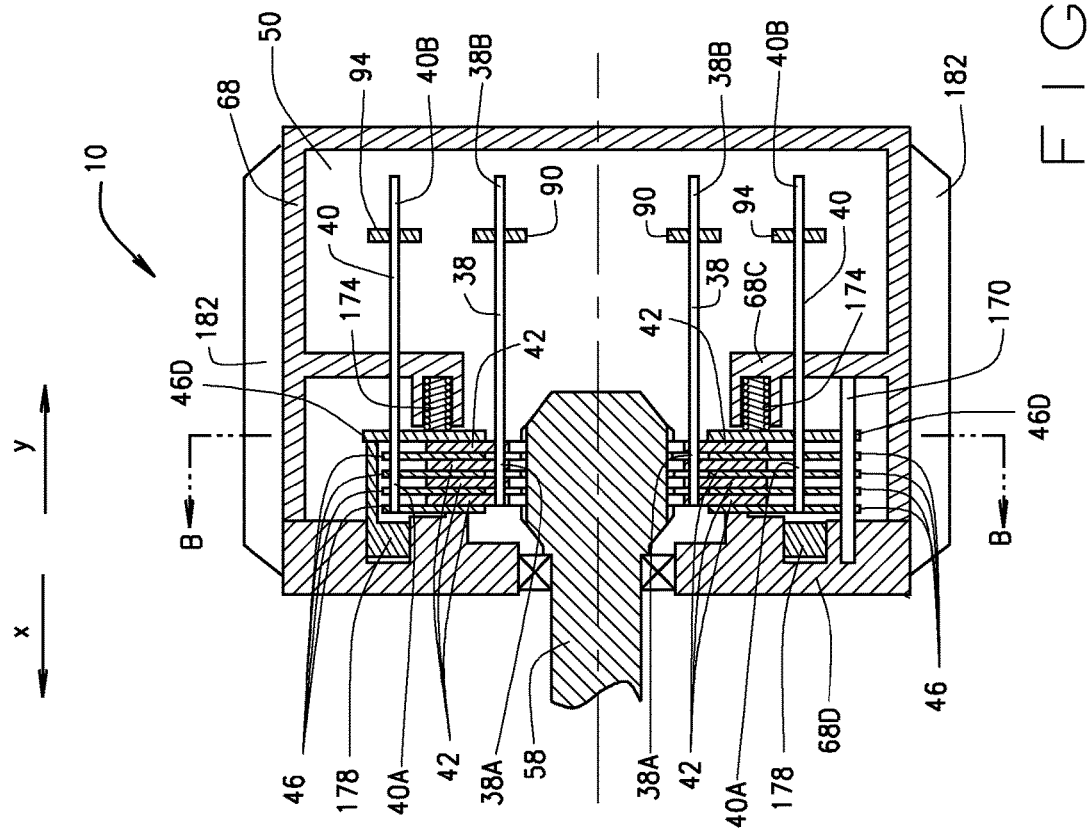

ial Application No. 61/917,473, filed on Dec. 18, 2013. The
HEAT PIPE COOLED WET ROTATING DISC ENGAGEMENT SYSTEMS

CROSS-REFERENCE TO RELATED APPLICATIONS

This application claims the benefit of U.S. Provisional Application No. 61/917,473, filed on Dec. 18, 2013. The disclosure of the above application is incorporated herein by reference in its entirety.

FIELD

The present teachings relate to wet rotating disc engagement systems, and more particularly to wet brakes and clutches that are cooled utilizing heat pipes.

BACKGROUND

The statements in this section merely provide background information related to the present disclosure and may not constitute prior art.

Wet rotating disc engagement systems, e.g., wet brake and/or wet clutch systems, have many advantages over dry rotating disc engagement systems, e.g., dry brake and clutch systems. One of the key advantages is their superior ability to remove the heat generated in the friction surfaces (i.e., the surfaces between opposing discs). They are superior to dry systems because the friction surfaces are submerged in oil and thus the heat can be removed directly by conduction thru the friction surfaces and then conduction from the friction surfaces into the oil. Nonetheless, the friction surfaces of such wet rotating disc engagement systems still get significantly hotter than the oil because the amount of fluid between the opposing friction faces is minimal and the heat has to travel to the outer surfaces of the discs before it can be effectively transferred to the oil.

SUMMARY

In various embodiments, the present disclosure provides wet rotating disc engagement systems, e.g., a wet brake systems and/or wet clutch systems, for mobile platforms and/or stationary platforms, wherein the system comprises a plurality of first heat pipes having evaporator ends disposed within a plurality of first discs of the wet rotating disc engagement system and/or a plurality of second heat pipes having evaporator ends disposed within a plurality of second discs of the wet rotating disc engagement system. Additionally, condenser ends of the first and/or second heat pipes are disposed within oil retained within an oil reservoir of the wet rotating disc engagement system.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 1 is an illustration of a wet rotating disc engagement system, in accordance with various embodiments of the present disclosure.

FIG. 2B is a cross-section, of the wet rotating disc engagement system, shown in FIG. 1, configured as a wet clutch, in accordance with various other embodiments of the present disclosure.

Corresponding reference numerals indicate corresponding parts throughout the several views of drawings.

DETAILED DESCRIPTION

Figure 1A:
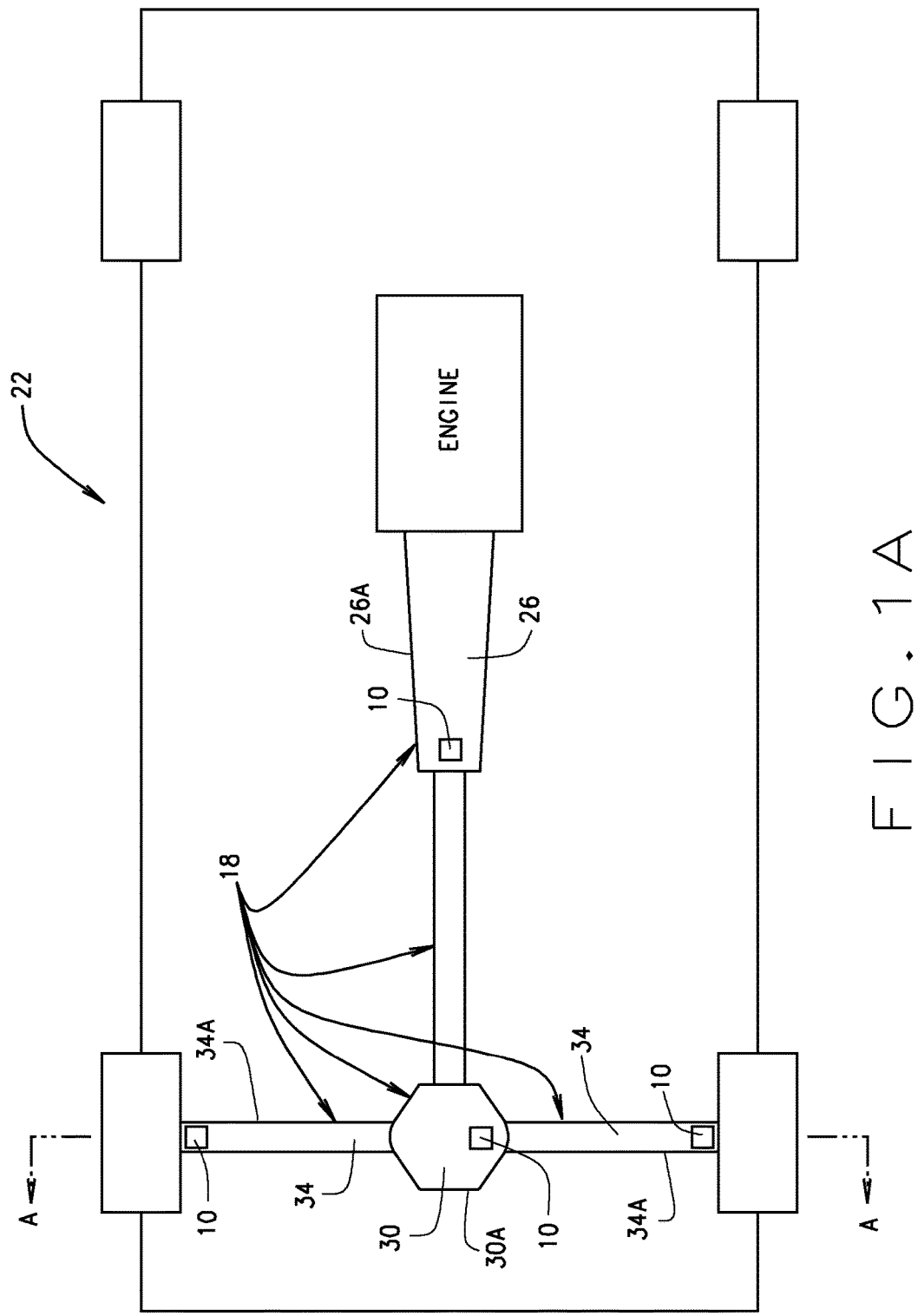
FIG. 1A is a block diagram of the wet rotating disc engagement system, shown in FIG. 1, configured as a wet brake disposed in a mobile platform drivetrain, in accordance with various embodiments of the present disclosure.

The following description is merely exemplary in nature and is in no way intended to limit the present teachings, application, or uses. Throughout this specification, like reference numerals will be used to refer to like elements.

Referring to FIG. 1, the present disclosure provides a wet rotating disc engagement system 10 that is structured and operable to enhance the cooling of rotational friction surfaces within the system 10, in accordance with various embodiments of the present disclosure. The system 10 comprises a plurality of first heat pipes 38 having evaporator ends 38A disposed within and/or extending through a plurality of first discs 42 that are fixedly engaged on a rotatable axle or shaft 58. In various embodiments, the system 10 can additionally comprise a plurality of second heat pipes 40 having evaporator ends 40A disposed within and/or extending through a plurality of second discs 46 that are fixedly connected to a housing of the system 10, e.g., a brake system housing 66 for a mobile platform or a clutch system housing 68 of a stationary or mobile platform, as described below. Each of the first and second heat pipes 38 and 40 additionally have condenser ends 38B and 40B, respectively, that extend into and are disposed within an oil reservoir 50 defined by the respective housing 66/68.

The plurality of first and second heat pipes 38 and 40 are structured and operable to remove heat from the first discs 42 and/or the second discs 46 and transfer the removed heat to oil disposed in the oil reservoir 50. Generally, the heat pipes, e.g., heat pipes 38/40, function by absorbing or conducting heat from a structure or environment, e.g., from the discs 42/46, at their evaporator ends, e.g., evaporator ends 38A/40A of the heat pipe. The absorbed heat will cause a working fluid inside the heat pipes to turn to vapor at the evaporator ends, thereby increasing the vapor pressure inside the heat pipes. Subsequently, the vapor pressure at the evaporator ends will be higher than the equilibrium vapor pressure at opposing condenser ends, e.g., condenser ends 38B/40B, of the heat pipes. The pressure difference drives a rapid mass transfer of the heated and vaporized working fluid from the evaporator ends to the condenser ends. In various embodiments of the present disclosure, the condenser ends are disposed within the oil retained in the oil reservoir 50 such that the condenser ends are maintained at temperature significantly lower than the temperature of the evaporator ends.

Subsequently, the vaporized working fluid transferred to the condenser ends condenses and releases its latent heat, thereby heating the condenser ends of the heat pipes. Thus, the heat absorbed, or conducted, at the evaporator ends is efficiently transferred, i.e., transferred with minimal thermal resistance, to the condenser ends of the heat pipes, whereafter, via the thermally conductive contact between the condenser ends and the oil within in the oil reservoir 50, the heat from the condenser ends of the heat pipes is efficiently transferred to the oil. Due to the heat from the vaporized working fluid being absorbed at the condenser ends and transferred to the oil, the working fluid will condense and be driven back to the evaporator ends, generating a cooling cycle within the heat pipes. Thus, the wet rotating disc engagement system 10, as described herein, is structured and operable to improve operation and increase longevity of the respective component of the respective platform incorporating the system 10.

In various embodiments, the system 10 can further include a first heat pipe condenser end stabilization device 90, e.g., an annular ring through which the condenser end 38B of each first heat pipe 38 extends. The stabilization device 90 is structured and operable to provide stability and rigidity to the condensers ends 38B by linking them together. Additionally, the stabilization device 90 can provide additional surface area to reject heat from the condenser ends 38B into the oil in the oil reservoir and reduce turbulence within the oil as the shaft 58, first discs 42 and first heat pipes 38 rotate through the oil.

Additionally, in various embodiments, the system 10 can further include a second heat pipe condenser end stabilization device 94, e.g., an annular ring through which the condenser end 40B of each second heat pipe 38 extends. The stabilization device 94 is structured and operable to provide stability and rigidity to the condensers ends 40B by linking them together. Additionally, the stabilization device 94 can provide additional surface area to reject heat from the condenser ends 40B into the oil in the oil reservoir and reduce turbulence within the oil when second heat pipes 40 rotate through the oil.

The wet rotating disc engagement system 10, as described herein, can be implemented in any platform wherein the first discs 38 are fixedly engaged with the rotatable shaft 58 such that the first discs 38 can be rotated by rotation of the shaft 58, and the second discs 40 are controllably engageable with the first discs 38 to generate frictional forces therebetween, and thereby transfer torque to/from the shaft 58 from/to the respective housing 66/68.

Figure 2A:
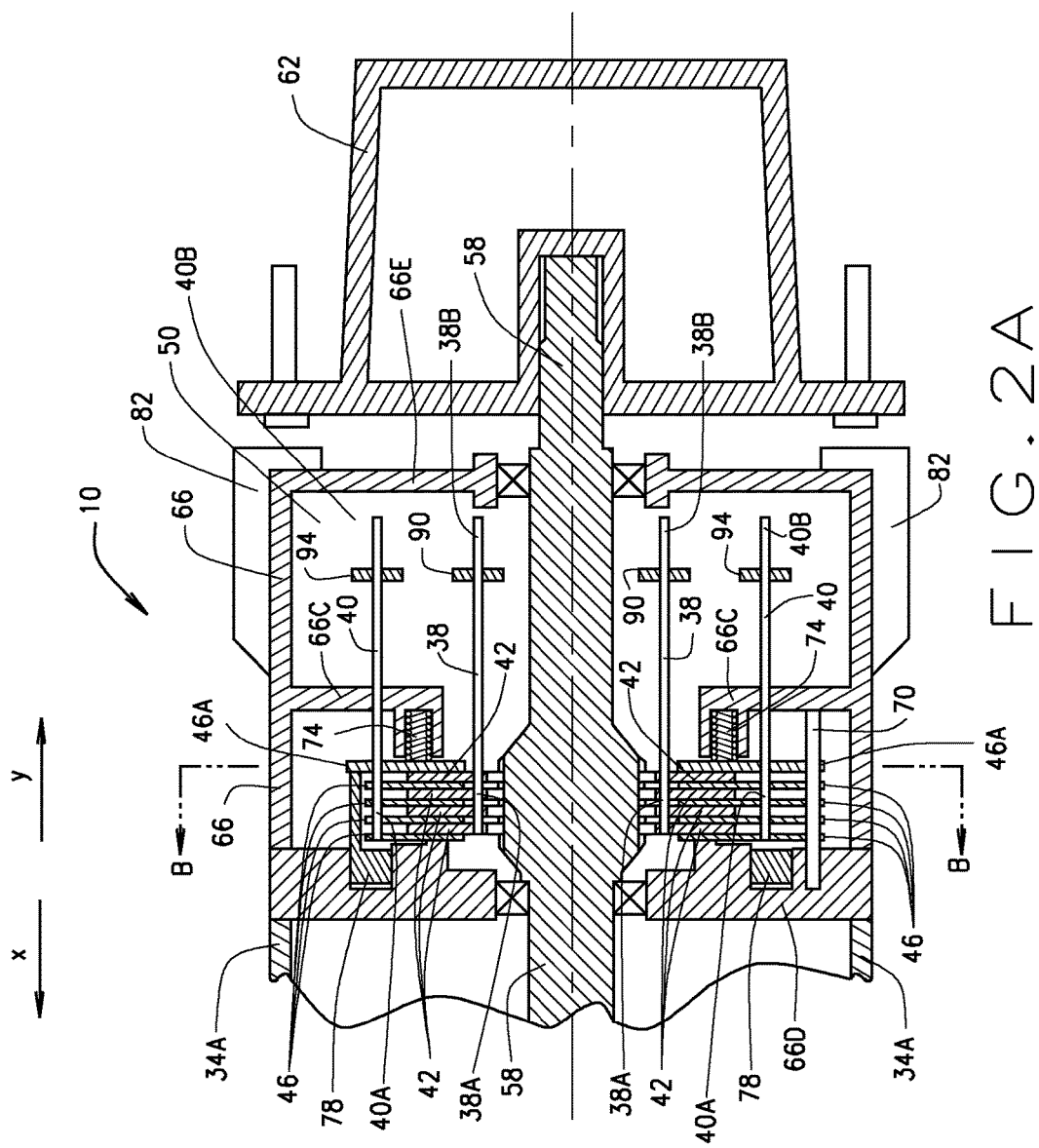
FIG. 2A is a cross-section, along A-A in FIG. 1A, of the wet brake system shown in FIG. 1A incorporated within an axle assembly of the mobile platform, in accordance with various embodiments of the present disclosure.
Figure 3:
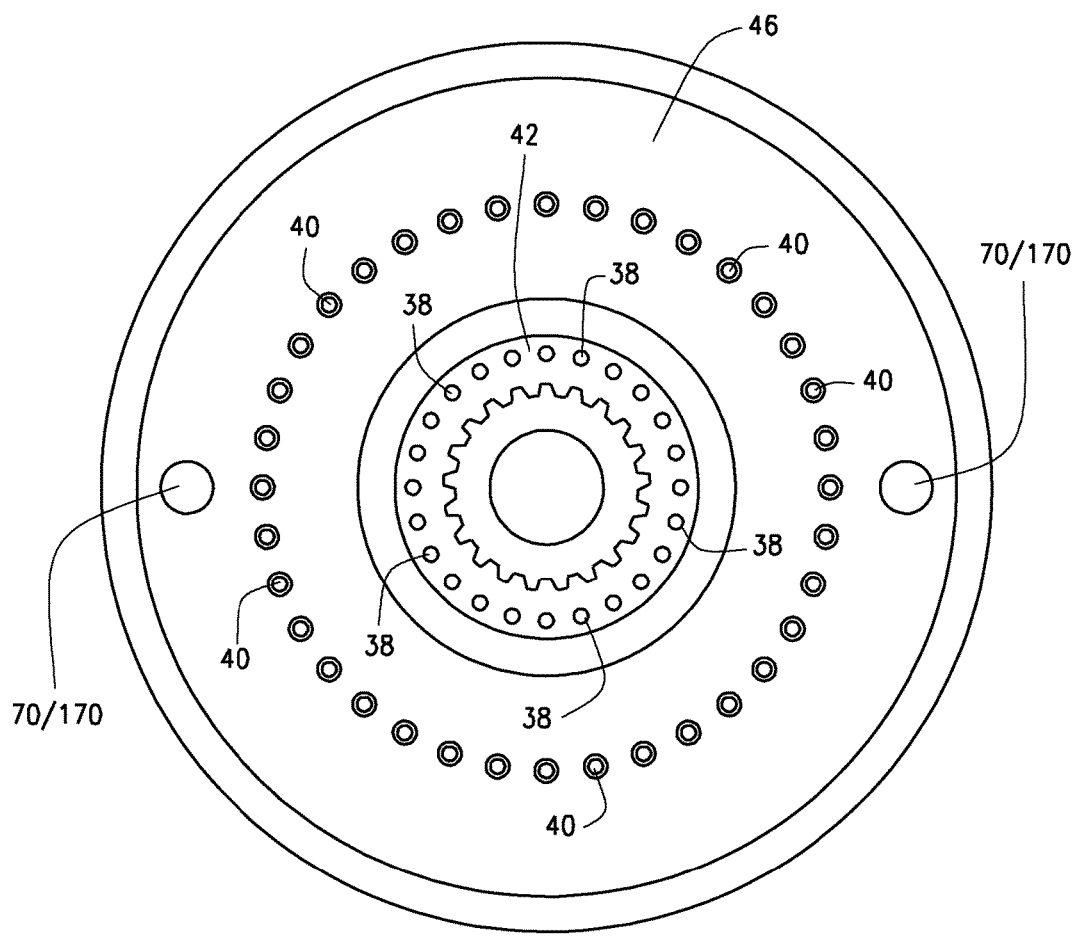
FIG. 3 is a cross-section, along B-B in FIGS. 2A and 2B, in accordance with various embodiments of the present disclosure.

For example, as exemplarily illustrated in FIGS. 1A, 2A and 3, in various embodiments the wet rotating disc engagement system 10 can comprise wet brake assembly of a mobile and/or stationary platform 22, referred to hereafter as wet brake assembly 10. The mobile platform 22 can comprise any mobile platform, e.g., a car, truck, bus, sports utility vehicle, tractor, or any other vehicle or mobile platform that utilizes friction brakes to slow and stop the respective mobile platform 22. Moreover, in such embodiments, the wet brake assembly 10 can be incorporated into any one or more suitable portion(s) or location(s) of a drivetrain 18 of the mobile platform 22 to slow and stop the respective mobile platform 22. That is, the wet brake assembly 10 can be disposed in or attached to any suitable portion of the drivetrain 18. For example, in various embodiments, the wet brake system 10 can be disposed within or connected to a transmission 26 of the drivetrain 18. Or, in various other embodiments, the wet brake system 10 can be disposed within or connected to a differential 30 of the drivetrain 18. Or, in yet other embodiments, the wet brake system 10 can be disposed within or connected to an axle assembly 34 of the drivetrain 18.

Although, as described above, the wet brake system 10 can be incorporated into any suitable portion or location of a drivetrain 18, for simplicity and clarity, the wet brake system 10 will be primarily described herein as being connected to an end of the axle assembly 34 of the drivetrain 18 of the vehicle 22.

In such embodiments, the plurality of first discs 42 comprise rotating discs (referred to herein as rotating discs 42) as they are fixedly attached to the rotatable shaft 58 and will rotate along with rotation of the shaft 58. Additionally, the housing comprises the stationary brake housing 66 and the plurality of second discs 46 comprise stationary discs, or pads, 46 (referred to herein as stationary discs 46) that are stationarily disposed within, or affixed to, the brake housing 66. As exemplarily illustrated in FIG. 2A, in various embodiments the wet brake system 10 can be connected to an end of or integrated with an axle housing 34A of the drivetrain axle assembly 34 such that the rotatable axle 58 of the axle assembly 34 extends through the wet brake system 10 and has a wheel hub 62 connected to an end thereof.

In such embodiments, a plurality of torque pins 70, or any other suitable fixation devices, extend through each of the stationary discs 46 having a first end affixed to or retained within an internal partition 66C and an opposing second end affixed to or retained within an back wall 66D of the brake housing 66. The torque pins 70 stationarily retain the stationary discs 46 within the brake housing 66 such that the stationary discs 46 are prevented from rotating about the shaft 58. The plurality of the rotating discs 42 are interstitially disposed between the stationary discs 46 and fixedly connected to the shaft 58 such that the rotating discs 42 will rotate between the stationary discs 46 in accordance with rotation of the shaft 58. Importantly, the rotating discs 42 are fixedly connected to the shaft 58 such that rotation of the shaft 58, and hence rotation of the wheel hub 62 that is connected to the shaft 58, will be slowed and/or stopped via friction generated between the stationary and rotating discs 46 and 42 during actuation of the wet brake assembly 10, as described below.

The plurality of stationary discs 46 includes a primary disc 46A disposed at an outermost location relative to the plurality of rotating discs 42. That is, in the sequence of rotating discs 42 interstitially disposed between the stationary discs 46, the primary disc 46A is one of the two outermost stationary discs 46, whereby there is only one side of the primary disc 46A that has a rotating disc 42 disposed adjacent thereto.

In such embodiments, the wet brake assembly 10 further includes at least one biasing device 74, e.g., a spring, solenoid, piston or other suitable biasing device, and at least one piston 78. The biasing device(s) 74 is/are structured and operable to apply a constant force to the primary disc 46A in a first direction X. Conversely, the piston(s) 78 is/are structured and operable to selectively apply a force to the primary disc 46A in a second direction Y, that is opposite the first direction X and is sufficient to overcome the constant force in the first direction X applied to the primary disc 46A by the biasing device(s) 74. The resulting, or sum, force applied to the primary disc 46B by the biasing devices(s) 74 and piston(s) 78, as controlled by operation of the piston(s) 78, dictates whether the stationary discs 46 are squeezed, or compressed, together into braking contact with the interstitial rotating discs 42, wherein the rotating discs 42 are squeezed, or compressed, between the stationary discs 46, thereby slowing and/or stopping and/or preventing rotation of the rotating discs 42 and the shaft 58, or are pushed apart such that the rotating discs 42 allowed to rotate between the stationary discs 46, thereby allowing the shaft 58 to rotate.

Alternatively, in various other embodiments, the brake assembly 14 can be structured and operable such that piston(s) 78 apply the force in the X direction to compress the rotating discs 42 between the stationary discs 46, and the biasing device(s) 74 apply the force in the Y direction to separate or spread the stationary discs 46. Accordingly, in such embodiments, to allow the rotating discs 42 to rotate between the stationary discs 46 such that the shaft 58 and wheel hub 62 are allowed to rotate, the piston(s) 78 would be controllably de-actuated to allow the force in the Y direction applied to the primary disc 46A by the biasing device(s) 74 to be greater than the force applied to the primary disc 46A in the X direction by the piston(s) 78. And, conversely, to compress or squeeze the rotating discs 42 between the stationary discs 46 to slow and/or stop rotation of the shaft 58 and wheel hub 62, the piston(s) 78 would be controllably actuated to increase the force applied to the primary disc 46A in the X such that the X direction force is greater than the force in the Y direction applied to the primary disc 46A by the biasing device(s) 74. It should be understood that the operation of the rotating and stationary discs 42 and 46 to control rotation of the shaft 58, and hence the vehicle 22, as described above, is only exemplary and that any other suitable clutch engagement method is envisioned and within the scope of the present disclosure.

In such embodiments, the second heat pipes 40 comprise stationary heat pipes (referred to herein as stationary heat pipes 40) as they are fixed mounted within and connected to the brake housing 66 such that they are stationary. The stationary heat pipes 40 have their evaporator ends 40A disposed within an outer diameter portion of the stationary discs 46 and their condenser ends 40B disposed within the oil retained within the oil reservoir 50. Accordingly, heat generated by friction between the rotating and stationary discs 42 and 46 is removed from the stationary discs 46 at the evaporator ends 40A of the stationary heat pipes 40, transferred to the condenser ends 40B, and dissipated into the oil in the oil reservoir 50, thereby efficiently removing heat from and cooling the stationary discs 46.

Additionally, in such embodiments, the first heat pipes 38 comprise rotating heat pipes (referred to herein as rotating heat pipes 38) as they will rotate within the brake housing 66 along with rotation of the shaft 58 and rotating discs 42. The rotating heat pipes 38 have their evaporator ends 38A disposed within an inner diameter portion of the rotating discs 42 and the condenser ends 38B disposed within the oil retained within the oil reservoir 50. Accordingly, heat generated by friction between the rotating and stationary discs 42 and 46 is removed from the rotating discs 42 at the evaporator ends 38A of the heat pipes 38, transferred to the condenser ends 38B, and dissipated into the oil in the oil reservoir 50, thereby efficiently removing heat from and cooling the rotating discs 42.

Although the wet brake assembly 10 has been described above to include both the rotating and stationary heat pipes 38 and 40, it is envisioned that, in the various embodiments, the wet brake system 10 can include only the rotating heat pipes 38 or only the stationary heat pipes 40 and remain within the scope of the present disclosure.

In various embodiments, the wet brake system 10 can include a plurality of cooling fins 82 connected to or formed with the brake housing 66. The cooling fins 82 are structured and operable to remove heat from the oil reservoir 50 to enhance the removal of heat from the condenser ends of the rotating and stationary heat pipes 38 and 42, and thereby increase the efficiency and speed of the removal of heat from the rotating and stationary discs 42 and 46.

As described above, the wet brake system 10 can be disposed in or attached or mounted to any suitable portion of the drivetrain 18 such as the transmission 26, the differential 30 and/or the axle assembly 34. Furthermore, in various embodiments, it is envisioned that the brake housing 66 can comprise a portion of a transmission housing 26A such that the wet brake system 10 integrally formed with the transmission 26. Additionally, in various implementations of such embodiments, the oil reservoir 50 can be structured as an auxiliary reservoir formed within the transmission housing 26A such that the oil retained within the oil reservoir 50 is separate from transmission oil retained within the transmission 26. Alternatively, in various other implementations, the oil reservoir 50 can be formed by the transmission housing 26A such that the oil retained within the oil reservoir 50 is transmission oil retained within the transmission 26.

In various other embodiments, it is envisioned that the brake housing 66 can comprise a portion of an axle housing 34A such that the wet brake system 10 integrally formed with the axle assembly 34. Additionally, in various implementations of such embodiments, the oil reservoir 50 can be structured as an auxiliary reservoir formed within the axle housing 34A such that the oil retained within the oil reservoir 50 is separate from axle oil retained within the axle assembly 34. Alternatively, in various other implementations, the oil reservoir 50 can be formed by the axle housing 34A such that the oil retained within the oil reservoir 50 is axle oil retained within the axle assembly 34.

In yet other embodiments, it is envisioned that the brake housing 66 can comprise a portion of a differential housing 30A such that the wet brake system 10 integrally formed with the differential 30. Additionally, in various implementations of such embodiments, the oil reservoir 50 can be structured as an auxiliary reservoir formed within the differential housing 30A such that the oil retained within the oil reservoir 50 is separate from differential oil retained within the differential 30. Alternatively, in various other implementations, the oil reservoir 50 can be formed by the differential housing 30A such that the oil retained within the oil reservoir 50 is differential oil retained within the differential 30.

As a further example, exemplarily illustrated in FIGS. 2B and 3, in various embodiments the wet rotating disc engagement system 10 can comprise a wet clutch assembly, referred to hereafter as wet clutch assembly 10, such as a transmission wet clutch. In such embodiments, the plurality of first discs 42 comprise active rotating discs (referred to herein as active rotating discs 42) as they are fixedly attached to the rotatable shaft 58 and will rotate along with rotation of the shaft 58. Additionally, the system housing comprises the rotatable clutch housing 68 and the plurality of second discs 46 comprise passive rotating discs 46 (referred to herein as passive rotating discs 46) that are stationarily disposed within, or affixed to, the rotatable clutch housing 68. In such embodiments, the clutch housing 68 that is rotationally mounted about, or connected to, the rotatable shaft 58 such that when the wet clutch assembly 10 is engaged, as described below, the rotatable clutch housing 68 will be rotatably driven by and rotate along with the rotatable shaft 58. More specifically, the clutch housing 68 of the wet clutch assembly 10 is rotatably mounted to an end of the rotatable shaft 58.

In such embodiments, a plurality of torque pins 170, or other suitable fixation device, extend through each of the passive rotating discs 46 having a first end affixed to or retained within an internal partition 68C and an opposing second end affixed to or retained within an back wall 68D of the clutch housing 68. The torque pins 170 stationarily retain the passive rotating discs 46 within the clutch housing 68 such that rotation of the passive rotating discs 46, as described below, will affect rotation of the clutch housing 68. The plurality of the active rotating discs 42 are interstitially disposed between the passive rotating discs 46 and fixedly connected to the shaft 58 such that the active rotating discs 42 will rotate between the passive rotating discs 46 in accordance with rotation of the shaft 58. Importantly, the active rotating discs 42 are fixedly connected to the shaft 58 such that rotation of the shaft 58, will impart rotation of the clutch housing, via friction generated between the active rotating discs and the passive rotating discs 42 and 46 during actuation of the wet clutch assembly 10, as described below.

The plurality of passive rotating discs 46 includes a primary disc 46D disposed at an outermost location relative to the plurality of active rotating discs 42. That is, in the sequence of active rotating discs 42 interstitially disposed between the stationary discs 46, the primary disc 46D is one of the two outermost passive rotating discs 46, whereby there is only one side of the primary disc 46D that has an active rotating disc 42 disposed adjacent thereto.

In various embodiments, the wet clutch assembly 10 further includes at least one biasing device 174, e.g., a spring, solenoid, piston or other suitable biasing device, and at least one piston 178. The biasing device(s) 174 is/are structured and operable to apply a constant force to the primary disc 46D in a first direction X. Conversely, the piston(s) 178 is/are structured and operable to selectively apply a force to the primary disc 46D in a second direction Y, that is opposite the first direction X and is sufficient to overcome the constant force in the first direction X applied to the primary disc 46D by the biasing device(s) 174. The resulting, or sum, force applied to the primary disc 46D by the biasing device(s) 174 and piston(s) 178, as controlled by operation of the piston(s) 178, dictates whether the passive rotating discs 46 are squeezed, or compressed, together into interlocking contact with the interstitial active rotating discs 42, wherein the active rotating discs 42 are squeezed, or compressed, between the stationary discs 46, thereby frictionally connecting or interlocking the active rotating discs 42 with the passive rotating discs 46. As a result rotation of active rotating discs 42 will be imparted to the passive rotating discs 46 and affect rotation of the passive rotating discs 46. More particularly, rotation of the shaft 58 will be imparted to, and affect rotation of, the clutch housing 68, via the frictional connection/interlocking of the active and passive rotating discs 42 and 46.

Alternatively, in various other embodiments, the clutch assembly 14 can be structured and operable such that piston(s) 178 apply the force in the X direction to compress the active rotating discs 42 between the passive rotating discs 46, and the biasing device(s) 174 apply the force in the Y direction to separate or spread the passive rotating discs 46. Accordingly, in such embodiments, to allow the active rotating discs 42 to rotate between the passive rotating discs 46 such that the clutch housing 68 will not be rotationally driven by rotation of the shaft 58, the piston(s) 178 would be controllably de-actuated to allow the force in the Y direction applied to the primary disc 46D by the biasing device(s) 174 to be greater than the force applied to the primary disc 46D in the X direction by the piston(s) 178. And, conversely, to compress or squeeze the active rotating discs 42 between the passive rotating discs 46 to affect rotation of the clutch housing 68, the piston(s) 178 would be controllably actuated to increase the force applied to the primary disc 46D in the X such that the X direction force is greater than the force in the Y direction applied to the primary disc 46D by the biasing device(s) 174.

It should be understood that the operation of the rotating and stationary discs 42 and 46 to control rotation of the shaft 58, and hence the vehicle 22, as described above, is only exemplary and that any other suitable clutch engagement method is envisioned and within the scope of the present disclosure. For example, in various embodiments, the rotating and stationary discs 42 and 46 can be mechanically engaged and disengaged using any suitable mechanical assembly.

In such embodiments, the second heat pipes 40 comprise passive rotating heat pipes (referred to herein as passive rotating heat pipes 40). The passive rotating heat pipes 40 have their evaporator ends 40A disposed within an outer diameter portion of the passive rotating discs 46 and their condenser ends 40B disposed within the oil retained within the oil reservoir 50. Accordingly, heat generated by friction between the rotating and stationary discs 42 and 46 is removed from the stationary discs 46 at the evaporator ends 40A of the stationary heat pipes 40, transferred to the condenser ends 40B, and dissipated into the oil in the oil reservoir 50, thereby efficiently removing heat from and cooling the passive rotating discs 46.

Additionally, in such embodiments, the first heat pipes 38 comprise active rotating heat pipes (referred to herein as active rotating heat pipes 38). The active rotating heat pipes 38 have their evaporator ends 38A disposed within an inner diameter portion of the active rotating discs 42 and the condenser ends 38B disposed within the oil retained within the oil reservoir 50. Accordingly, heat generated by friction between the active and passive rotating discs 42 and 46 is removed from the active rotating discs 42 at the evaporator ends 38A of the heat pipes 38, transferred to the condenser ends 38B, and dissipated into the oil in the oil reservoir 50, thereby efficiently removing heat from and cooling the active rotating discs 42.

Although the wet clutch assembly 10 has been described above to include both the active and passive rotating heat pipes 38 and 40, it is envisioned that, in the various embodiments, the wet clutch system 10 can include only the active rotating heat pipes 38 or only the passive rotating heat pipes 40 and remain within the scope of the present disclosure.

In various embodiments, the wet clutch system 10 can include a plurality of sprocket teeth or a spline 182 that is structure and operable to engage a torque transfer device (not shown), such as a chain, belt or gear, to affect rotation of a secondary object (not shown), e.g., an electric generator operably connected to the torque transfer device. In various embodiments, the sprocket teeth or spline 182 can also be structured as cooling fins operable to remove heat from the oil reservoir 50 to enhance the removal of heat from the condenser ends of the active and passive rotating heat pipes 38 and 40, and thereby increase the efficiency and speed of the removal of heat from the active and passive rotating discs 46 and 42.

In summary, the heat pipes 38 and 40, as described above, will enhance the heat transfer from the first and second discs 42 and 46 to the oil retained within the oil reservoir 50 and lower the temperature of the respective first and second discs 42 and 46. This reduced temperature is the result of the ability of the heat pipes 38 and 40 to transfer a large amount of heat while maintaining a small temperature gradient. In addition, the condenser ends of the heat pipes 38 and 40 are disposed within a large volume of oil retained within the oil reservoir 50, whereby the large volume of the oil reservoir 50 provides significantly greater heat absorption capacity as compared to the relatively small volume of oil between the first and second discs 42 and 46 as found in traditional wet brakes and clutches.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A wet disc engagement system, said system comprising:
    a plurality of first discs mounted to a rotatable shaft of the system;
    a plurality of second discs fixedly mounted to a housing of the system and frictionally engageable with first discs;
    a plurality of heat pipes comprising:
        evaporator ends disposed within at least one of the plurality of first discs and the plurality of second discs; and
        condenser ends that are disposed within oil retained within an oil reservoir defined by the housing.

2. The system of claim 1, wherein the housing comprises a stationary brake housing such that frictional engagement of the first and second discs will affect slowing of rotation of first disc and the shaft.

3. The system of claim 2, wherein the brake housing comprises a portion of one of a transmission housing, an axle housing and a differential housing of a mobile platform.

4. The system of claim 3, wherein the oil reservoir is an auxiliary reservoir formed within the one of the transmission housing, the axle housing and the differential housing such that the oil retained within the oil reservoir is separate from transmission oil within the transmission housing, axle oil within the axle housing and differential oil within differential housing.

5. The system of claim 3, wherein the oil reservoir is formed by the one of the transmission housing, the axle housing and the differential housing such that the oil retained within the oil reservoir is one of transmission oil within the transmission housing, axle oil within the axle housing, and differential oil within the differential housing.

6. The system of claim 2, wherein the brake housing mounts to one of a transmission housing, an axle housing and a differential housing of a mobile platform.

7. The system of claim 1 wherein the housing forms at least a portion the oil reservoir and the system further comprises a plurality of cooling fins connected to the housing, the cooling fins structured and operable to remove heat from the oil reservoir.

8. The system of claim 1, wherein the housing comprises a clutch housing rotatably connected to the rotatable shaft such that frictional engagement of the first and second discs will affect rotation of the clutch housing.

9. The system of claim 8, wherein the housing comprises a portion of one of a transmission housing, an axle housing and a differential housing of a mobile platform.

10. The system of claim 9 wherein the clutch housing forms at least a portion the oil reservoir.

11. A wet disc engagement system, said system comprising:
    a housing;
    an oil reservoir defined by the housing;
    a rotatable shaft extending through the housing;
    a plurality of first discs mounted to the shaft;
    a plurality of second discs fixedly mounted to the housing and frictionally engageable with first discs, the first discs being interstitially disposed therebetween such that the first discs will rotate between the second discs with rotation of the shaft;
    a biasing device structured and operable to apply a constant force in a first direction to frictionally engage the first and second discs;
    a piston structured and operable to controllably apply force in a second direction that is opposite the first direction to counter the force applied by the biasing device to controllably disengage the first and second discs such that the first and second discs are controllably engagable based on the sum of the biasing device and piston forces; and
    a plurality of heat pipes comprising:
        evaporator ends disposed within at least one of the plurality of first discs and the plurality of second discs; and
        condenser ends that are disposed within oil retained within the oil reservoir.

12. The system of claim 11, wherein the housing comprises a stationary brake housing and the system further comprises a wheel hub connected to an end of the shaft such that frictional engagement of the first and second discs will affect slowing of rotation of first disc and the shaft and the wheel hub.

13. The system of claim 12, wherein the brake housing comprises a portion of one of a transmission housing, an axle housing and a differential housing of a mobile platform.

14. The system of claim 13, wherein the oil reservoir is an auxiliary reservoir formed within the one of the transmission housing, the axle housing and the differential housing such that the oil retained within the oil reservoir is separate from transmission oil within the transmission housing, axle oil within the axle housing and differential oil within differential housing.

15. The system of claim 13, wherein the oil reservoir is formed by the one of the transmission housing, the axle housing and the differential housing such that the oil retained within the oil reservoir is one of transmission oil within the transmission housing, axle oil within the axle housing, and differential oil within the differential housing.

16. The system of claim 12, wherein the brake housing mounts to one of a transmission housing, an axle housing and a differential housing of a mobile platform.

17. The system of claim 11 wherein the housing forms at least a portion the oil reservoir and the system further comprises a plurality of cooling fins connected to the brake housing, the cooling fins structured and operable to remove heat from the oil reservoir.

18. The system of claim 11, wherein the housing comprises a clutch housing rotatably connected to the rotatable shaft such that frictional engagement of the first and second discs will affect rotation of the clutch housing.

19. The system of claim 18 wherein the clutch housing forms at least a portion the oil reservoir.

20. A drivetrain for a mobile platform, said drivetrain comprising:
    a transmission;
    a differential operatively connected to the transmission;
    an axle operatively connected to the differential; and
    a wet disc engagement system, said system comprising:
        a plurality of first discs mounted to a rotatable shaft of the system;

a plurality of second discs fixedly mounted to a housing of the system and frictionally engageable with first discs;
a plurality of heat pipes comprising:
evaporator ends disposed within at least one of the plurality of first discs and the plurality of second discs; and
condenser ends that are disposed within oil retained within an oil reservoir defined by the housing.

* * * * *